D. W. FELLOWS.
FRUIT PICKER.
APPLICATION FILED MAY 4, 1916.
1,240,128.
Patented Sept. 11, 1917.
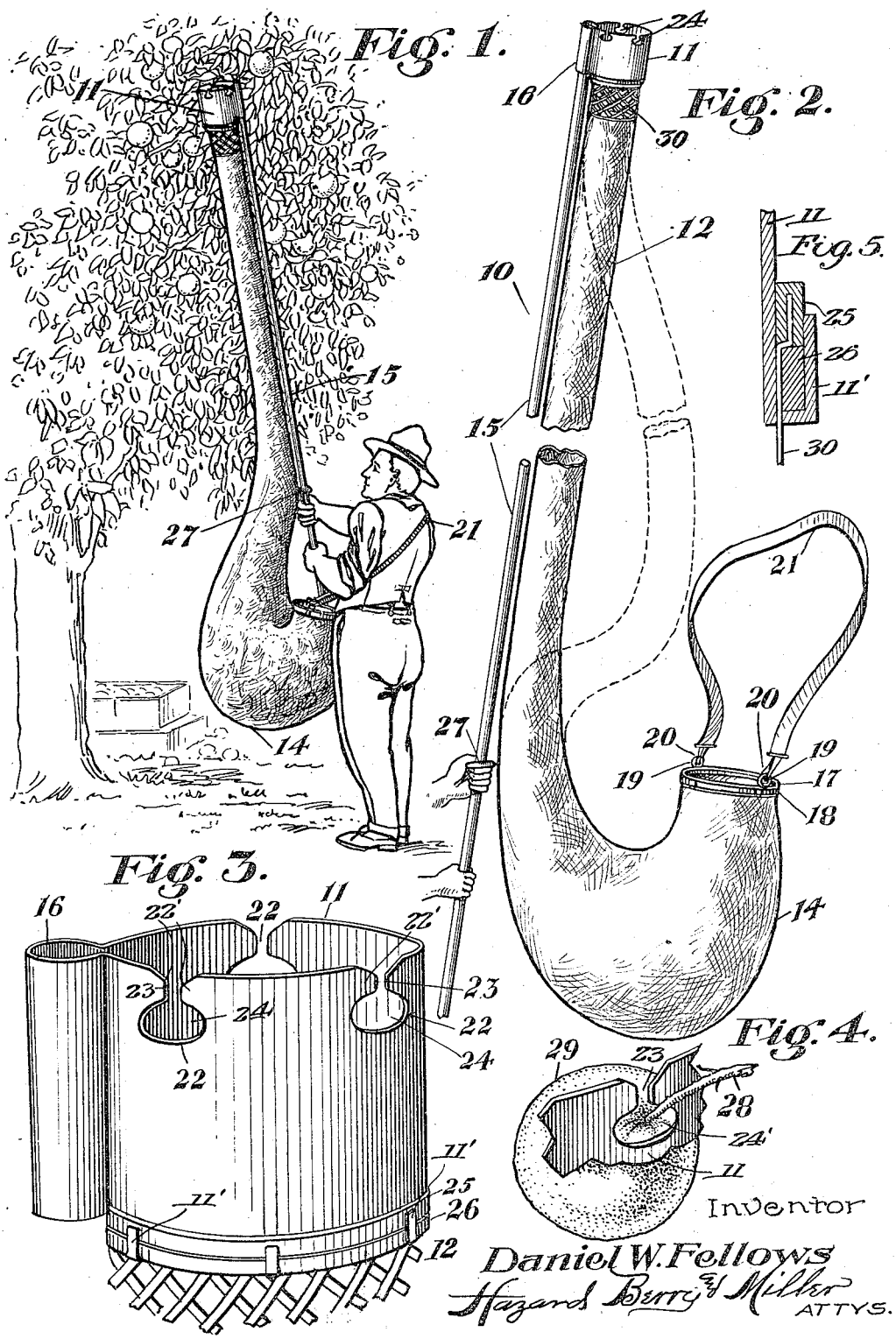
Inventor
Daniel W. Fellows
Hazard Berry & Miller
ATTYS.

UNITED STATES PATENT OFFICE.

DANIEL W. FELLOWS, OF LOS ANGELES, CALIFORNIA.

FRUIT-PICKER.

1,240,128.  Specification of Letters Patent.  Patented Sept. 11, 1917.

Application filed May 4, 1916. Serial No. 95,453.

*To all whom it may concern:*

Be it known that I, DANIEL W. FELLOWS, a citizen of the United States, residing at Los Angeles, in the county of Los Angeles and State of California, have invented new and useful Improvements in Fruit-Pickers, of which the following is a specification.

This invention relates to a fruit picker and particularly pertain to a device for picking fruit from trees.

It is an object of this invention to provide a fruit picking device which will remove fruit from the tree and deliver it to a receptacle without bruising.

Another object of this device is to provide a fruit picker which is portable and is adapted to be operated while the operator stands upon the ground beneath the tree.

Another object is to provide means controlled by the operator whereby the fall of the fruit is retarded and in this manner insured against bruising.

Another object is to provide a fruit picker which embodies a picking member and a fruit carrying receptacle which may be suitably carried by the operator and which has a flexible conduit leading from it to the picking member.

Another object is to provide means whereby the fruit being picked will not be obscured from view by the device but may be readily seen as positioned within the picking member.

A further object is to provide a fruit picking device which is light in weight, simple in operation, and may be easily manipulated to reach and pick the fruit.

Other objects will appear hereinafter.

The invention is illustrated in the accompanying drawings in which:

Figure 1 is a view in perspective illustrating the application and operation of the device.

Fig. 2 is a view in perspective showing the detail construction of the device, with a portion broken away and a dotted line position illustrating the manner in which the hose is manipulated to break the fall of the picked fruit.

Fig. 3 is a perspective view in detail illustrating the construction of the fruit picking member.

Fig. 4 is a fragmentary view illustrating the manner in which the picking member engages the fruit and the stem thereof.

Fig. 5 is a sectional detail view showing the manner in which the fruit conduit is supported by the picking member.

Referring to the drawings more particularly, 10 indicates a fruit picking device which is shown as comprising a picking member 11, a flexible conduit 12 connecting therewith, and a receptacle 14 formed integral with the conduit 12. A supporting staff 15 is secured at its upper end within a mounting 16 upon the side of the picking member 11, the opposite end of said staff being of suitable shape to provide a handle which might be firmly held and manipulated. The receptacle 14 is formed with an opening 17 which is bound by an annular ring 18. The ring 18 is provided with suitable eyes 19 for detachable engagement with snap fasteners 20, which are suitably secured to the ends of a shoulder strap 21.

Reference being had to Fig. 3, in which the picking member is illustrated in detail, it will be seen that the member is cylindrical in shape and hollow, and is formed with a series of open-ended slots 22 which are disposed around the upper marginal edge of the member. The slots 22 comprise a shallow notch 22′ sloping toward the middle, from which a constricted passage 23 leads to an enlarged circular opening 24 beneath. The lower edge of the member 11 is formed with a series of tangs 11′ which are adapted to support a ring 25 within which the upper edge of the fruit conduit is held and a ring 26 positioned therebeneath and directly supported by the tangs 11′ which are bent therearound and thus secure the upper end of the conduit in a stable manner.

The conduit 12 is made of some suitable fabric material and of a grade of fabric which possesses flexibility such as muslin or a light weight canvas. The length of the conduit 12 is determined by the character of the tree from which the fruit is to be gathered. The lower end of the conduit is enlarged, as particularly shown in Fig. 2, and terminates with a carrying receptacle 14 of sufficient size and capacity to carry considerable fruit. It has been found that the capacity of a half-bushel is a convenient size for this member. A ring 27 is secured to the side of the conduit 12 and adjacent the upper end of the receptacle 14, and is mounted upon and adapted to move freely along the carrying staff 15 for a purpose which will hereafter be described. The upper end of the conduit 12 is provided with a screen portion 30 which is interposed between the edge of the fabric of the conduit and the picking member. This portion is formed of wire netting having a mesh of suitable dimensions to allow the operator to see into the lower end of the picking member and thus intelligently manipulate the picker to engage the fruit.

In the operation of the device, when it is desired to pick a certain class of fruit, a picker of suitable size is selected and the shoulder strap 21 conveniently positioned upon the body of the operator. The snap fasteners 20 are then hooked within the fastening eyes 19 and the handle of the staff 15 is grasped in the manner disclosed in Fig. 1 of the drawing. As the fruit is discovered upon the tree, by sighting through the screen portion 30 adjacent the picker, the picking member 11 is positioned beneath the fruit and moved upwardly. At the same time one of the open-ended slots 22, which are here shown as three in number, is moved into engagement with the stem 28 of the fruit 29, as particularly shown in Fig. 4. If the fruit is ripe, a slight twist of the picking member 11 will disengage it from its stem and cause it to fall downwardly through the conduit 12. The particular construction of the slots 22 which constitute fruit stem cutting means, prevents the twigs and branches of the tree in getting caught therein, while allowing the fruit stem to easily slip through the shallow notch 22′ through the constricted passage 23 into the enlarged opening 24, where slight twist of the picking member will disengage the fruit from the stem. In the ordinary fruit picker, the fruit picking recesses are widest at the top, gradually converging downwardly to a point. Such a construction has the disadvantage of being interfered with the branches of the tree. Simultaneous with the twisting movement of the picking member, the lowermost hand of the operator, as it grips the supporting staff, is moved upwardly beneath the ring 27 to the position indicated by dotted lines in Fig. 2. It is evident that this movement will act to cause a bend in the conduit and allow the impact of the falling fruit to be broken. A downward movement of the hand will again allow the conduit to straighten and cause the fruit to roll gently into the carrying receptacle without having been bruised during its fall, irrespective of the distance of fall of the fruit from the ground. When the receptacle is filled, it may be emptied through the opening 17.

It will thus be seen that I have provided a device for picking fruit from trees which will effectively allow the fruit to be picked while the operator stands upon the ground, and will deliver the fruit to a portable carrying receptacle without danger of bruising.

I claim:

1. In a fruit picker, the combination of a handle, a cylindrical fruit-picking member carried thereby, said member having a straight upper edge provided at spaced intervals with a plurality of recesses constituting fruit stem cutters, each recess being formed of a shallow notch sloping rapidly toward the middle and having at its lowest point a constricted passage terminating in an enlarged circular opening, and a fruit-receiving bag connected to said fruit-picking member.

2. In a fruit picker, the combination of a handle, a tubular fruit-picking member carried thereby, said member having a straight upper edge provided at spaced intervals with a plurality of recesses constituting fruit stem cutters, each recess being formed of a shallow notch sloping rapidly toward the middle and having at its lowest point a constricted passage terminating in an enlarged opening, and a fruit-receiving bag connected to said fruit-picking member.

3. In a fruit picker a tubular fruit-picking member provided at its lower edge with a plurality of spaced ring supports, a flexible fruit conduit encircling said member, and through which said supports project, rigid conduit supporting means secured to the upper end of said conduit, and a clamping ring carried by said ring supports below said rigid members for holding said conduit in frictional engagement with said fruit-picking member.

4. In a fruit picker, a tubular fruit-picking member provided with a plurality of spaced ring supports, a flexible fruit conduit encircling the lower end of said member and being provided at its upper end with a conduit supporting ring, and a clamping ring carried by said ring supports below said conduit supporting ring for clamping said conduit against said fruit-picking member.

In testimony whereof I have signed my name to this specification.

DANIEL W. FELLOWS.

Copies of this patent may be obtained for five cents each, by addressing the "Commissioner of Patents, Washington, D. C."